United States Patent
Zhang et al.

(10) Patent No.: US 10,866,414 B2
(45) Date of Patent: Dec. 15, 2020

(54) SYSTEM WITH HOLOGRAPHIC HEAD-UP DISPLAY

(71) Applicants: Arthur Y. Zhang, San Jose, CA (US); Graham B. Myhre, San Jose, CA (US); Hyungryul J. Choi, San Jose, CA (US); Matthew E. Last, San Jose, CA (US)

(72) Inventors: Arthur Y. Zhang, San Jose, CA (US); Graham B. Myhre, San Jose, CA (US); Hyungryul J. Choi, San Jose, CA (US); Matthew E. Last, San Jose, CA (US)

(73) Assignee: Apple Inc., Cupertino, CA (US)

( * ) Notice: Subject to any disclaimer, the term of this patent is extended or adjusted under 35 U.S.C. 154(b) by 186 days.

(21) Appl. No.: 15/745,374

(22) PCT Filed: Jul. 15, 2016

(86) PCT No.: PCT/US2016/042630
§ 371 (c)(1),
(2) Date: Jan. 16, 2018

(87) PCT Pub. No.: WO2017/011799
PCT Pub. Date: Jan. 19, 2017

(65) Prior Publication Data
US 2019/0056587 A1 Feb. 21, 2019

Related U.S. Application Data

(60) Provisional application No. 62/192,871, filed on Jul. 15, 2015.

(51) Int. Cl.
*G03H 1/00* (2006.01)
*G02B 27/01* (2006.01)
*B60K 35/00* (2006.01)

(52) U.S. Cl.
CPC .......... *G02B 27/0101* (2013.01); *B60K 35/00* (2013.01); *G02B 27/0103* (2013.01); *B60K 2370/29* (2019.05); *G02B 2027/0105* (2013.01)

(58) Field of Classification Search
CPC ...... G02B 5/32; G02B 27/01; G02B 27/0101; G02B 27/0103; G02B 2027/0105;
(Continued)

(56) References Cited

U.S. PATENT DOCUMENTS 4,981,332 A * 1/1991 Smith ................ G02B 27/0103
359/13
5,475,512 A * 12/1995 Nakazawa ......... G02B 27/0103
359/13
(Continued)

FOREIGN PATENT DOCUMENTS

EP 1974980 A1 10/2008
FR 3002802 A1 9/2014
(Continued)

OTHER PUBLICATIONS

Kress, B. C., and Shin, M., Diffractive and Holographic Optics as Optical Combiners in Head Mounted Displays, Session: Wearable Systems for Industrial Augmented Reality Applications, UbiComp'13, Sep. 8-12, 2013, Zurich, Switzerland.
(Continued)

*Primary Examiner* — Arnel C Lavarias
(74) *Attorney, Agent, or Firm* — Treyz Law Group, P.C.; Kendall W. Abbasi

(57) ABSTRACT

A vehicle may have a head-up display that produces a display output allowing a viewer in the vehicle to observe two-dimensional or three-dimensional content. The head-up display may include a display unit that produces the display output and an optical combiner on a vehicle window that directs the display output towards the viewer. The optical combiner may be a holographic or diffractive optical ele-
(Continued)

ment or may be an array of angled reflectors such as micromirrors embedded in an index-matching material. Optical combiners formed from holographic elements may be configured to reflect light at an angle of reflection that is different than the angle of incidence, thereby allowing light to reach a viewer's eyes even when the head-up display reflects light off of a side window on a vehicle door. A holographic optical element may include volume holographic media such as photopolymers or holographic polymer dispersed liquid crystal.

20 Claims, 7 Drawing Sheets

(58) Field of Classification Search
CPC .... G02B 2027/0107; G02B 2027/0109; G02B 2027/0112; G02B 27/017; G02B 27/0172; G02B 2027/0174; G02B 2027/0192; G02B 2027/0194; G02B 2027/0196; G03H 1/00; G03H 1/0005; G03H 1/02; G03H 1/024; G03H 1/0248; G03H 1/0252; G03H 1/0256; G03H 1/0272; G03H 1/04; G03H 2001/0415; G03H 2001/043; G03H 1/22; G03H 2001/2263; G03H 2001/2265; G03H 2001/2268; G03H 2001/2271; G03H 1/26; G03H 1/30; G03H 2001/306; G03H 2227/00; G03H 2001/303
USPC ........ 359/1, 3, 8, 13, 14, 15, 22, 24, 25, 32, 359/33, 35; 430/1, 2
See application file for complete search history.

(56) References Cited

U.S. PATENT DOCUMENTS

| | | | |
|---|---|---|---|
| 5,698,906 A * | 12/1997 | Gardner | E05B 41/00 307/9.1 |
| 5,710,646 A | 1/1998 | Kimura et al. | |
| 5,729,366 A * | 3/1998 | Yang | G02B 27/01 359/13 |
| 5,859,714 A * | 1/1999 | Nakazawa | B32B 17/10036 359/13 |
| 5,900,982 A | 5/1999 | Dolgoff et al. | |
| 7,703,924 B2 | 4/2010 | Nayar | |
| 2005/0280894 A1 | 12/2005 | Hartkop et al. | |
| 2006/0109202 A1 | 5/2006 | Alden | |
| 2007/0002412 A1 | 1/2007 | Aihara | |
| 2010/0253917 A1 | 10/2010 | Gao et al. | |

FOREIGN PATENT DOCUMENTS

| | | | |
|---|---|---|---|
| JP | 2000071877 A | * | 3/2000 |
| JP | 2001255488 A | | 9/2001 |
| JP | 2011213186 A | * | 10/2011 |

OTHER PUBLICATIONS

Mysing, John O. et al., Holographic Combiners for Head-Up Displays, Air Force Avionics Laboratory, Environmental Research Institute of Michigan, 1977, Ann Arbor, MI.

Takaki, "Super multi-view display and its applications", Global 3D Tech Form 2014 Symposium, Institute of Engineering, Tokyo University of Agriculture and Technology, 38 pages.

Takaki et al., "Super multi-view windshield display for long-distance image information presentation", Optics Express 704, vol. 19, No. 2, Jan. 17, 2011, Institute of Engineering, Tokyo University of Agriculture and Technology, 13 pages.

Owano, "Prototype uses multi-lens display for 3-D depth", Phys. org, Nov. 7, 2011, 3 pages. [Retrieved on Aug. 3, 2015]. Retrieved from the Internet:<URL: http://phys.org/news/201111prototypemultilensddepthvideo.html>.

Myhre et al., U.S. Appl. No. 15/264,048, filed Sep. 13, 2016.

* cited by examiner

SYSTEM WITH HOLOGRAPHIC HEAD-UP DISPLAY

This application claims priority to U.S. provisional patent application No. 62/192,871, filed on Jul. 15, 2015, which is hereby incorporated by reference herein in its entirety.

BACKGROUND

This relates generally to displays and, more particularly, to head-up displays.

Vehicles such as automobiles are sometimes provided with head-up displays. Typical head-up displays project images onto the windshield of a vehicle. A driver of the vehicle can view the projected images while driving. Head-up displays are typically used to display vehicle status information such as speedometer information. Head-up displays allow information to be safely displayed for a driver without requiring the driver to look away from the road ahead.

In conventional head-up displays, a virtual image is created by using a display in a dashboard to project light onto the front windshield of the vehicle at a given angle of incidence, which then reflects the light to the driver's eyes at an angle of reflection that matches the angle of incidence. Since the position of the front windshield is generally a fixed design parameter, the display in the dashboard is precisely positioned to direct light towards the front windshield at a specific angle of incidence so that the light correctly reflects off of the windshield towards the driver.

Traditional head-up displays of this type can place undesirable restrictions on the location of head-up displays in the vehicle. For example, a conventional head-up display may be incompatible with the side window of a vehicle because light reflected off of the side window from a display reasonably mounted within the structure of the vehicle does not reach the user's eyes due to the law of reflection.

It would therefore be desirable to be able to provide improved head-up displays for displaying information for the occupants of a vehicle in a wider range of locations.

SUMMARY

A vehicle may have windows. A head-up display may produce output that reflects off of one of the windows towards a viewer such as a driver or other occupant in the vehicle.

The head-up display may include a display unit that produces the display output and an optical combiner on a vehicle window that directs the display output towards the viewer. The optical combiner may be a holographic or diffractive optical element or may be an array of angled reflectors such as micromirrors embedded in an index-matching material.

Optical combiners formed from holographic elements may be configured to reflect light at an angle of reflection that, if desired, can be different than the angle of incidence, thereby allowing light to reach a viewer's eyes even when the head-up display reflects light off of a side window in the vehicle. The diffraction order spacing of the holographic optical element may be controlled to reflect a given input angle to a desired output angle.

A holographic optical element may include volume holographic media such as photopolymers or holographic-polymer dispersed liquid crystal in which a reflective hologram has been written (e.g., using the interference of two lasers). The holographic element may be a single layer that has been written with one or more colors or may be multiple layers where each layer has been written with one or more colors.

The holographic optical element may be non-switchable (e.g., may include a permanently encoded hologram) or may be switchable (e.g., may be adjusted by applying an electric field).

Optical combiners formed from angled reflectors may also be configured to direct light towards a viewer even when the optical combiners are formed on side windows of a vehicle. Each reflector in the optical combiner may be angled such that light is reflected off of each individual reflector according to the law of reflection and is directed towards the viewer's eyes.

DETAILED DESCRIPTION

Systems such as vehicles and other systems may incorporate displays. As an example, a vehicle may have a head-up display that displays vehicle status information such as vehicle speed, direction, and location, fuel gauge information, battery charge level information, status information on vehicle operations such as headlight status, heating and air-conditioner status, seatbelt status, headlight status, media playback information (e.g., current radio station and track information), messages, alerts, augmented-reality-based information, navigation, media, video, conferencing, and other information.

Figure 1:
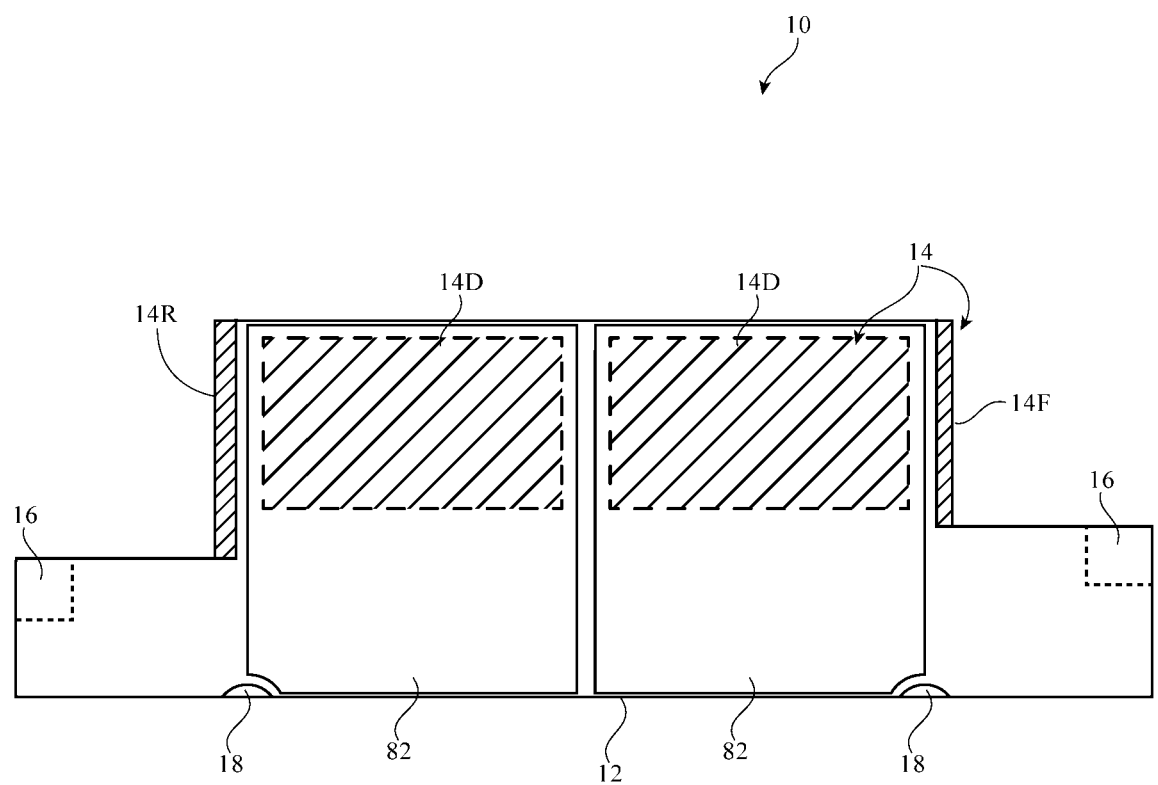
FIG. 1 is a side view of an illustrative vehicle with a head-up display in accordance with an embodiment.

A side view of an illustrative vehicle of the type that may be provided with a head-up display is shown in FIG. 1. As shown in FIG. 1, vehicle 10 may include a body such as body 12. Body 12 may have body panels and other structures that are mounted on a chassis. Interior components in vehicle 10 such as seating for a driver and other vehicle occupants may be supported by the chassis. External components such as wheels 18 may also be mounted to the chassis. The structures that make up body 12 may include metal structures, structures formed from fiber-composite materials such as carbon-fiber materials and fiberglass, plastic, and other materials.

Vehicle body 12 may include doors 82. Windows 14 may be formed at the front and rear of vehicle 10 in openings in body 12 and may be formed within doors 82 or other portions of the body 12 of vehicle 10. As shown in FIG. 1, for example, vehicle 10 may have a front window such as front window 14F that faces the front of vehicle, rear facing windows such as rear window 14R, and side windows such as windows mounted within the doors of vehicle 10 (see, e.g., side windows 14D). Windows 14 may be formed from glass (e.g., glass laminated with polymer layers), plastics such as polycarbonate, or other clear materials.

There may be one or more head-up displays in vehicle 10. Each head-up display may display images by reflecting light off of the interior surface of a respective one of windows 14. To provide the driver of vehicle 10 with head-up display information, a head-up display may be used to reflect light from front window 14F. Head-up displays may also be associated with rear window 14R and side windows 14D. The driver and other occupants of vehicle 10 such as front and rear seat passengers may, if desired, be provided with head-up displays. The viewer of a head-up display may be a vehicle driver, front-seat passenger, or rear-seat passenger. Configurations in which the viewer of the head-up display is a driver may sometimes be described herein as an example.

Figure 2:
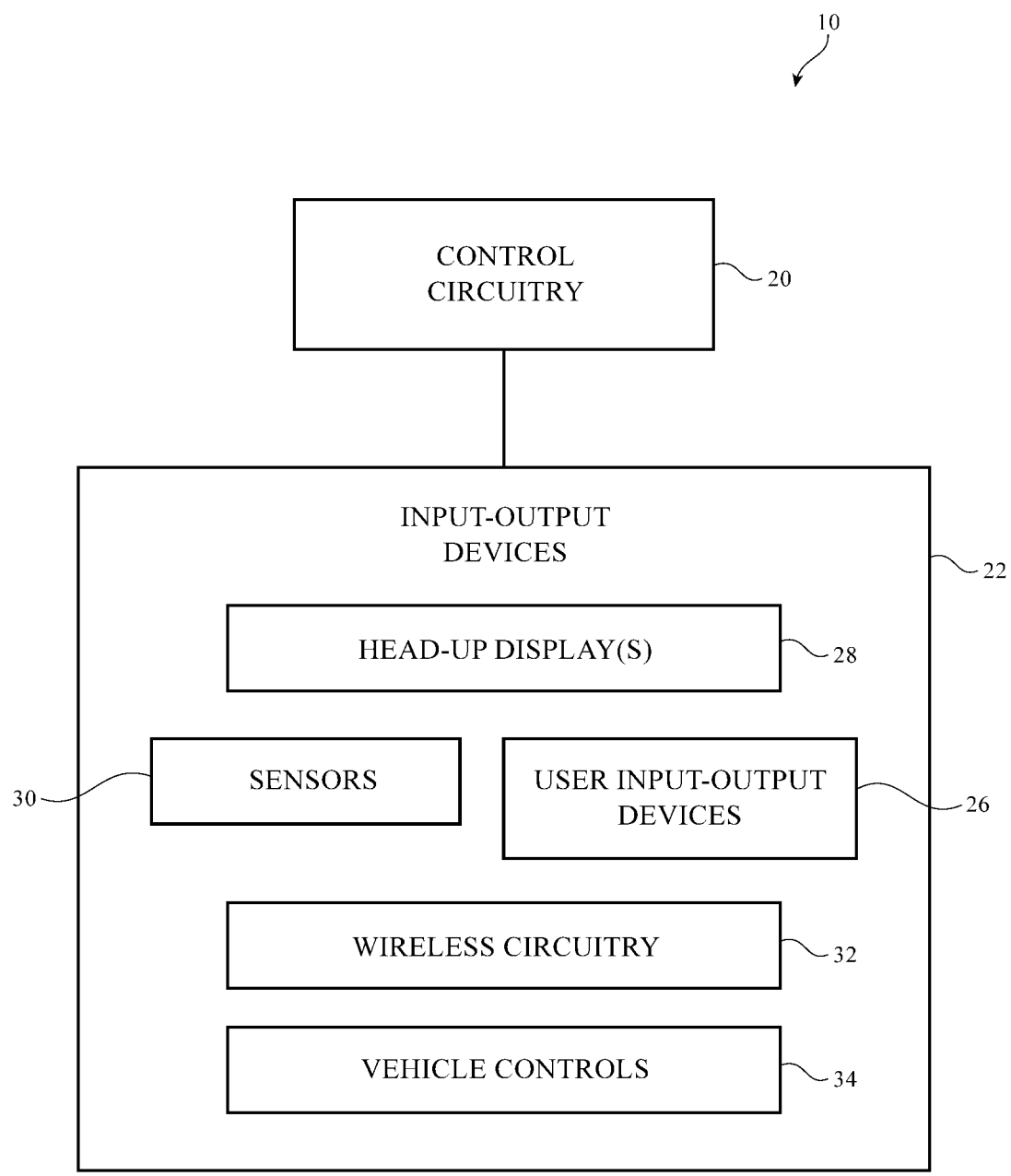
FIG. 2 is a schematic diagram of an illustrative vehicle or other system with a head-up display in accordance with an embodiment.

A schematic diagram of illustrative circuitry that may be used in operating vehicle 10 is shown in FIG. 2. As shown in FIG. 2, vehicle 10 may include control circuitry 20. Control circuitry 20 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 20 may be used to control the operation of device 10. The processing circuitry may be based on one or more microprocessors, microcontrollers, digital signal processors, baseband processors, power management units, audio chips, application specific integrated circuits, electronic control units, etc.

Vehicle 10 may include input-output devices 22 that allow data to be supplied to vehicle 10 and that allow data to be provided from vehicle 10 to external systems. Input-output devices 22 may include sensors 30 for gathering information on the operating environment of vehicle 10. Sensors 30 may include light-based sensors including image sensors, wireless sensors such as radar sensors, ultrasonic sensors, proximity sensors, range-finding sensors, ambient light sensors, strain gauges, parking sensors, cruise control sensors, accelerometers, touch sensors, magnetic sensors such as electronic compass sensors, temperature sensors, rain sensors and other moisture sensors, force sensors, pressure sensors (e.g., altimeters), speedometers, odometers, tachometers, battery charge gauges, fuel gauges, circuits for determining the status of headlights and other lighting 16, seat belt sensors, door lock sensors, fuel door status, trunk status (open or closed), window status (up or down), and other components for making measurements on the environment surrounding vehicle 10 and the operating status of vehicle 10. If desired, light-based sensors such as proximity sensors and cameras may include an illumination source (e.g., a visible and/or infrared light source). For example, a proximity sensor may include a light source for emitting infrared light that reflects off of external objects and a light sensor that detects the reflected light to determine how far away the external objects are from the vehicle. Infrared and/or visible light sources may also be used to illuminate the surroundings of vehicle 10 to be captured by a camera in sensors 30 (e.g., a rearview camera or other suitable camera in vehicle 10).

As shown in FIG. 2, input-output devices 22 may include user input-output devices 26. Devices 26 may be used to gather input from vehicle occupants and may be used in providing output to vehicle occupants. Devices 26 may include buttons, joysticks, steering wheels, shift levels and/or buttons, foot-actuated controllers (e.g., a throttle pedal, a brake pedal, a clutch pedal, etc.), touch pads, keypads, keyboards, motion sensors, microphones, cameras, and other devices for gathering user input. Output devices in devices 26 may also include circuitry for generating audio output such as speakers, tone generators, and vibrators and circuitry for generating visible output.

Input-output devices 22 may include one or more displays for displaying visual information for a viewer (e.g., a driver or other vehicle occupant). For example, input-output devices 22 may include one or more head-up displays 28. Head-up display 28 may include a projector (e.g., a projector based on a micromirror array), liquid crystal display, organic or inorganic light-emitting diode display, or other display unit for generating images for a viewer and an optical system for directing the images towards the viewer. The optical system may include a lens to project images from the display onto a window of vehicle 10 (e.g., side window 14D and/or front window 14F) so that the viewer (e.g., the driver of the vehicle) can view both head-up display content reflected from the window and real-life objects that are visible through the window.

An optical combiner may be used to reflect the display output from the display unit to the viewer's eyes while also allowing external light from outside of the vehicle to pass. The optical combiner may be based on holographic or diffractive optical elements or may be based on reflective optical elements. The optical combiner may be configured to reflect light towards the user's eyes even when the head-up display is located on a side window of the vehicle, a front windshield of the vehicle (e.g., a front windshield oriented vertically or near-vertically as is sometimes used in buses), or any other window of the vehicle (e.g., a skylight window or other suitable window, etc.).

Wireless circuitry 32 may include radio-frequency transceiver circuitry and antennas for transmitting and receiving wireless signals. The signals may include, for example, short-range signals such as wireless local area network signals (WiFi® and Bluetooth® signals) and long-range signals (e.g., cellular telephone signals and other signals at frequencies of 700 MHz to 2700 MHz and/or other suitable frequencies). Wireless information may be shared with nearby vehicles, sensors and beacons embedded along a roadway, satellites, cellular telephone networks, cellular telephones, wristwatches, and other wireless devices associated with a driver and passengers in vehicle 10, etc. Wireless information that is received by circuitry 32 may include traffic information, weather information, information on the status of nearby vehicles (e.g., direction of motion, acceleration/deceleration, brake status (braking due to application of brakes by a driver or not braking), throttle status (applied or not applied), temperature information, road condition information (as measured by sensors in vehicles and/or external sensors), etc.

Vehicle controls 34 may include control circuitry, actuators, and other systems for controlling vehicle operation. Vehicle controls 34 may include systems for steering, braking (manual brakes, emergency brakes, power-assisted brakes, drum brakes, disc brakes, regenerative brakes that use drive motors or other systems to recover energy and convert the kinetic energy of vehicle 10 into electrical energy stored in capacitors and/or batteries or that use other techniques for storing recovered energy, or other braking systems), accelerating, shifting gears, adjusting interior and exterior lights, adjusting infotainment functions, controlling satellite navigation system operation, adjusting airbags, seatbelts, and other safety devices, controlling audio output, controlling electronic windows, door locks, the opening and closing of doors and hatches, windshield wipers, defrosters, and other climate controls, and systems for controlling and adjusting other operations during the operating of vehicle 10.

Using information from sensors 30, user input and other input from devices 26, and/or information received wirelessly from remote sources via wireless circuitry 32, vehicle 10 may determine actions to take in supplying output and otherwise controlling the operation of vehicle 10. As an example, control circuitry 20 may determine that head-up display 28 should display vehicle status information to a viewer. The vehicle status information may include odometer information, speedometer information, tachometer information, fuel gauge or battery charge gauge information, seatbelt status information, headlight status information, fuel door status, information on the status of doors and windows in vehicle 10, and other vehicle operating status information. Control circuitry 20 may also display augmented reality information on display 28 for the viewer. For example, a warning sign may be placed in the field of view of the driver of vehicle 10 to alert the driver when a potential obstruction in the road is detected, to inform the driver when another vehicle is approaching vehicle 10 on a collision course, to inform the driver of poor upcoming road conditions or weather, etc. Augmented reality information may also include highlight regions to help a driver identify pedestrians or unexpected driving conditions. Public service announcements, driving tips, navigation information (maps, driving directions, points of interest, etc.) and other information may also be displayed.

In conventional vehicles, head-up displays are typically included only on the front windshield. Light from a display below the dashboard is projected towards the windshield at a given angle of incidence and is reflected off of the windshield at a given reflection angle that is equal to the angle of incidence. In these conventional vehicle displays, the front windshield is precisely angled to reflect light towards the driver's eyes.

It may be desirable to place head-up displays on surfaces of a vehicle other than the front windshield. To provide head-up displays on any suitable surface of a vehicle while still allowing light to reach the driver's eyes (or the eyes of any other passenger in the vehicle), some or all of head-up displays 28 in vehicle 10 may include optical combiners formed from holographic optical elements, diffractive optical elements, or an array of angled reflectors. Using these types of optical combiners, head-up displays 28 in vehicle 10 may be placed on various surfaces of a vehicle such as a side window or other suitable surface. The head-up content that is displayed may have the appearance of being located within the environment surrounding vehicle 10. For example, a highlight region for helping a driver identify the location of a pedestrian may appear to surround the pedestrian, an icon alerting the driver to a pothole or other road obstruction may visually appear to reside within the three-dimensional environment located adjacent to the pothole, etc. In configurations where head-up display 28 is a collimated display, the display content may be focused at infinity.

Figure 3:
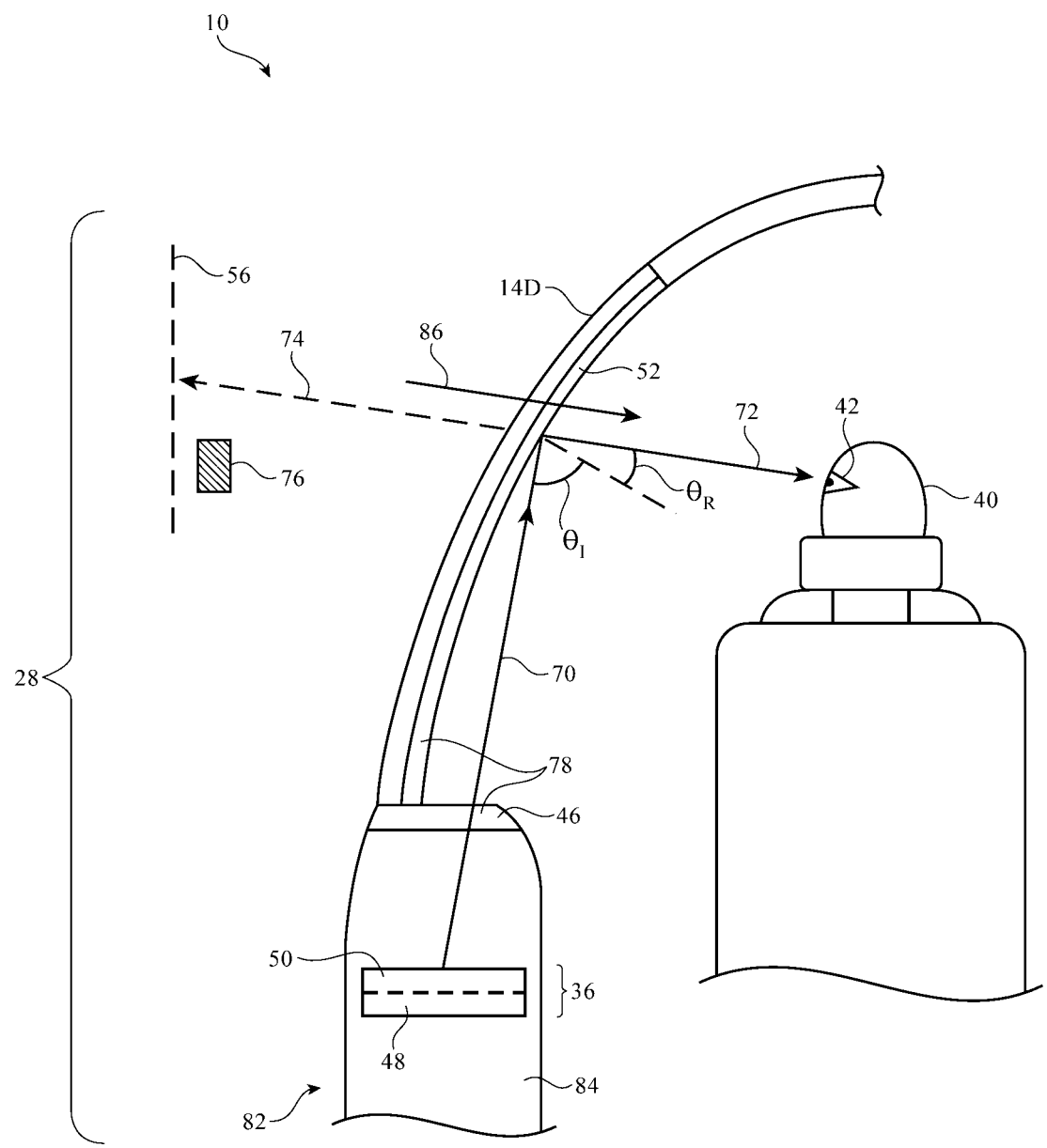
FIG. 3 is a side view of an illustrative head-up display on a side window of a vehicle in accordance with an embodiment.

FIG. 3 is a side view of an illustrative head-up display. As shown in FIG. 3, head-up display 28 may include one or more display units such as display unit 36 and an optical system such as optical system 78. Optical system 78 may include optical elements such as element 46 and optical combiner 52. In the illustrative example of FIG. 3, head-up display 28 is located on side window 14D. This is, however, merely illustrative. If desired, head-up displays 28 may be located on any suitable window or surface of vehicle 10.

In the example of FIG. 3, display unit 36 is located in body portion 84 of door 82. This is, however, merely illustrative. If desired, display unit 36 may be mounted in other locations in vehicle 10. Display unit 36 may be a display unit based on a liquid crystal display, organic or inorganic light-emitting diode display, cathode ray tube, plasma display, projector display (e.g., a projector based on an array of micromirrors), a silicon display unit, a digital light processing display unit, a microelectromechanical scanned display unit, a holographic display unit, a quantum dot display unit, or other suitable type of display. Display unit 36 may be an emissive display having a pixel layer such as layer 50 of light-generating pixels or display unit 36 may be a transmissive display in which pixels of layer 50 modulate light from a backlight such as backlight unit 48. Backlight unit 48 may include one or more light sources such as one or more lasers, one or more light-emitting diodes, one or more organic light-emitting diodes, one or more lamps, or other suitable light source. The light from backlight 48 may be colored light or may be white light such as white light that is filtered with color filters in pixel layer 50. Illumination source 48 may be a narrow band light source (e.g., a light source with less than 10 nm bandwidth, less than 5 nm bandwidth, or other suitable narrow bandwidth) or may be a broad band light source (e.g., a light source having a bandwidth between 5 nm and 30 nm, 10 nm and 35 nm, etc.).

Display unit 36 may generate light 70 associated with two-dimensional or three-dimensional content to be displayed to viewer 40. Optical system 78 may be used to present the light output from display unit 36 to viewer 40. For example, optical structures 78 may direct light 70 output from display unit 36 to the inner surface of side window 14D (or other suitable window in vehicle 10). Reflected light 72 may be viewed by a viewer such as viewer 40 who is looking through window 14D in direction 74. Viewer 40 may simultaneously view content from display unit 36 and objects external to vehicle 10 such as external object 76 by looking in direction 74.

Optical element 46 may be a lens, a light collimator, an optical filter, a refractive element, a computer-generated hologram, a transparent window, an opening, or other suitable structure for providing light from display unit 36 to optical combiner 52. As shown in FIG. 3, optical element 46 may be located at the top of body portion 84 where light 70 from display unit 36 exits body portion 84. Light 70 associated with an image may be projected from display unit 36 through optical element 46 towards optical combiner 52. Combiner 52 may be a coating, film, or glass layer that redirects the projected image from display unit 36 to viewer 40 such that viewer 40 sees a virtual two-dimensional or three-dimensional representation of the image at image plane 56. Combiner 52 may be configured to reflect some light while still allowing light to pass through so that viewer 40 can view both the projected image and real world objects outside of window 14D such as object 76. As shown in FIG.

3, external light 86 (e.g., light from outside of vehicle 10) may pass through window 14D and combiner 52 to reach eyes 42 of viewer 40.

Combiner 52 may be based on reflective and refractive optics or may be based on holographic (e.g., diffractive) optics. In arrangements where combiner 52 is formed from reflective and refractive optics, combiner 52 may include one or more reflectors (e.g., an array of micromirrors or other reflectors). In arrangements where combiner 52 is based on holographic optics, combiner 52 may include volume holographic media such as photopolymers, gelatin such as dichromated gelatin, silver halides, holographic polymer dispersed liquid crystal, or other suitable volume holographic media. A holographic recording may be stored as an optical interference pattern within the photosensitive optical material. The optical interference pattern may create a holographic grating that, when illuminated with a given light source, diffracts light to create a three-dimensional reconstruction of the holographic recording. The diffractive grating may be a non-switchable diffractive grating that is encoded with a permanent interference pattern or may be a switchable diffractive grating in which the diffracted light can be modulated by controlling an electric field applied to the holographic optical element. The use of diffractive/holographic optical elements may allow light to reflect off of combiner 52 at a reflection angle θR that is different than the incident angle θ1 to reach eyes 42 of viewer 40.

Figure 4:
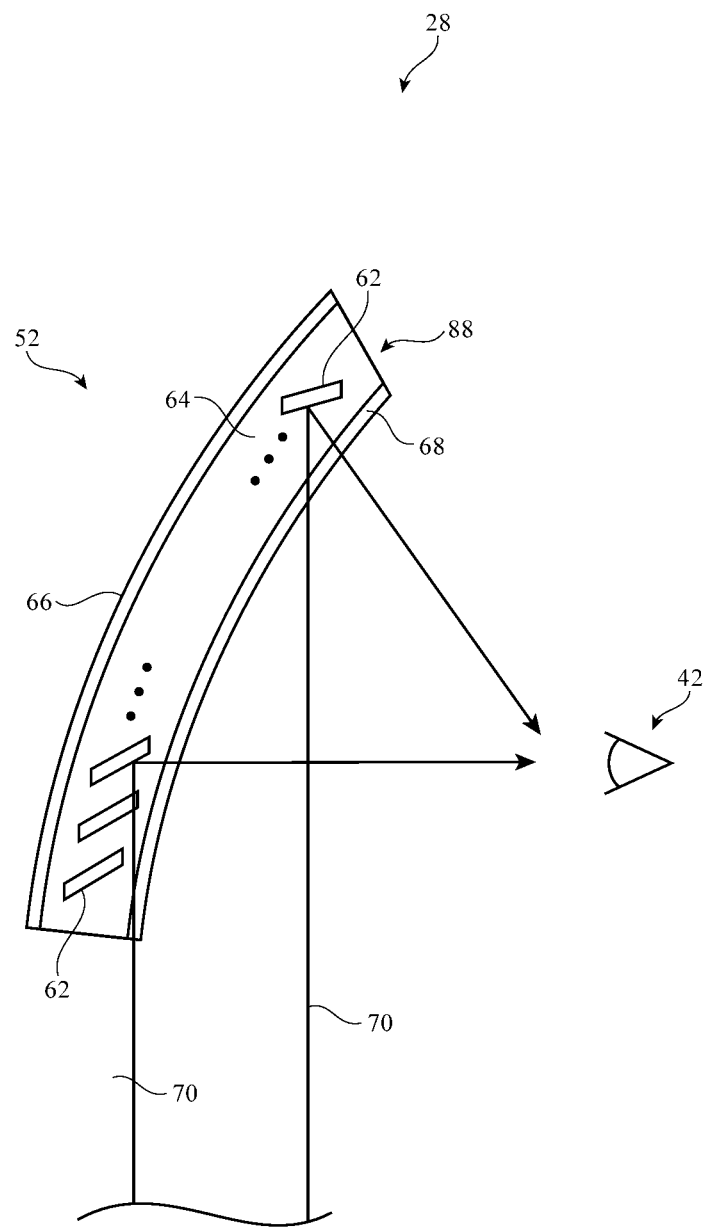
FIG. 4 is a cross-sectional side view of an illustrative head-up display of the type shown in FIG. 3 having an optical combiner formed from a holographic optical element in accordance with an embodiment.

FIG. 4 is a cross-sectional side view of an illustrative optical combiner that may be used in head-up display 28. In the example of FIG. 4, combiner 52 is a holographic optical element having a holographic layer 88 and optional additional layers such as layers 66 and 68. Layers 66 and 68 may include substrate layers and/or coating layers such as antireflective coatings, encapsulation or sealing layers, dichroic coatings, or other suitable coatings. In one illustrative arrangement, layer 66 is a substrate layer such as a thin polymer or glass substrate on which holographic layer 88 is formed. Layer 68 may be an antireflective coating and/or encapsulation layer that protects holographic layer 88 from the environment while also minimizing reflections from light having a given range of wavelengths.

Holographic layer 88 (sometimes referred to as a hologram, a holographic optical element, a holographic recording layer, or holographic material) may include materials 62 and 64 in which either or both materials may be light-sensitive. Material 62 may have one refractive index and material 64 may have a different refractive index to form a spatially periodic grating that diffracts incident light 70 to form a two-dimensional or three-dimensional virtual image for a viewer's eyes 42. Holographic layer 88 may include silver halide materials, dichromatic gelatin materials, or photopolymer materials. For example, holographic material 88 may include light-sensitive material such as silver halide (e.g., in regions 62) embedded in a thin gelatin layer (e.g., material 64). In arrangements where holographic material 88 is based on photopolymers, material 88 may be based on a modulation of the refractive index between polymerized zones (e.g., regions 62) and non-polymerized zones (e.g., regions 64 between regions 62).

The holographic grating formed in layer 88 may be switchable or non-switchable. In non-switchable arrangements, the interference pattern is a permanent pattern (e.g., a one-time written pattern where regions 62 are fixed with respect to regions 64). In switchable arrangements, grating 88 may be formed from polymer-dispersed liquid crystals. The liquid crystals may be immersed in a photopolymer. When an external electric field is applied, the refractive index of the liquid crystals changes. To create a holographic optical element from the polymer-dispersed liquid crystals, the polymer-dispersed liquid crystal material is exposed to an interference pattern to create local differences in photo-polymerization rates, thereby inducing periodic phase separation of discrete liquid crystal molecules with a period corresponding to the period of the interference pattern. During operation of vehicle 10, the diffraction of light may be controlled by applying an electric field to layer 88 to thereby control the state of liquid crystals in layer 88 (e.g., to control whether the liquid crystal molecules are dispersed in a random array or an aligned state). This allows head-up display 28 to be operated in different modes whereby the transmission of light through combiner 52 can be adjusted according to the mode of operation.

Holographic recoding layer 88 may produce monochromatic three-dimensional images or may produce full color three-dimensional images. Full color holographic combiners with one holographic layer 88 may be formed by exposing the holographic combiner to multiple colors. If desired, combiner 52 may be used only to redirect light or may be used to redirect light and to act as a lens and/or distortion correction element (e.g., to change the magnification of the image, the position of the image, distortion of the image, etc.).

Figure 5:
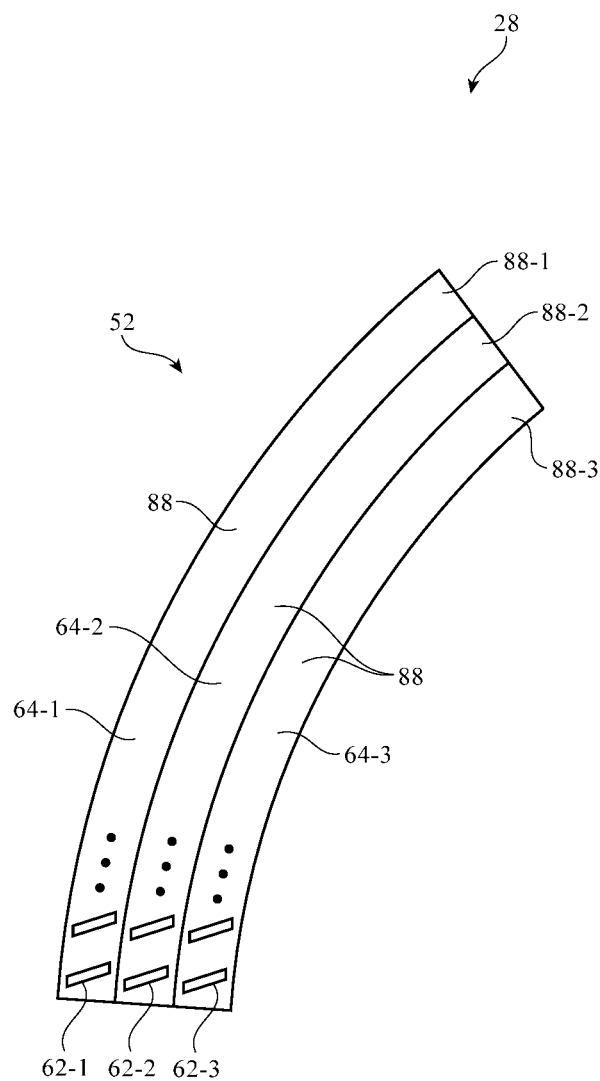
FIG. 5 is a cross-sectional side view of an illustrative head-up display of the type shown in FIG. 3 having an optical combiner formed from a holographic optical element with multiple layers in accordance with an embodiment.

The example of FIG. 4 in which combiner 52 includes only one holographic layer 88 is merely illustrative. If desired, combiner 52 may include multiple holographic layers. As shown in FIG. 5, for example, combiner 52 may include multiple holographic layers such as layers 88-1, 88-2, and 88-3, each having an interference pattern formed from regions of different refractive indices (e.g., regions 62-1 and 64-1 in layer 88-1, regions 62-2 and 64-2 in layer 88-2, and regions 62-3 and 64-3 in layer 88-3). There may be any suitable number of holographic element layers 88 (e.g., one, two, three, four, five, or more than five layers). The example of FIG. 5 in which combiner 52 includes three hologram layers 88 is merely illustrative.

Each layer 88 may record a different interference pattern or two or more layers may have the same interference pattern. Each layer 88 may be monochromatic or may include multiple colors. In one illustrative arrangement, layers 88 may contain three superimposed holograms, each exposed for a particular wavelength so that a full color three-dimensional image may be produced. Layers 88 may be switchable diffractive elements or may be non-switchable diffractive elements.

Figure 6:
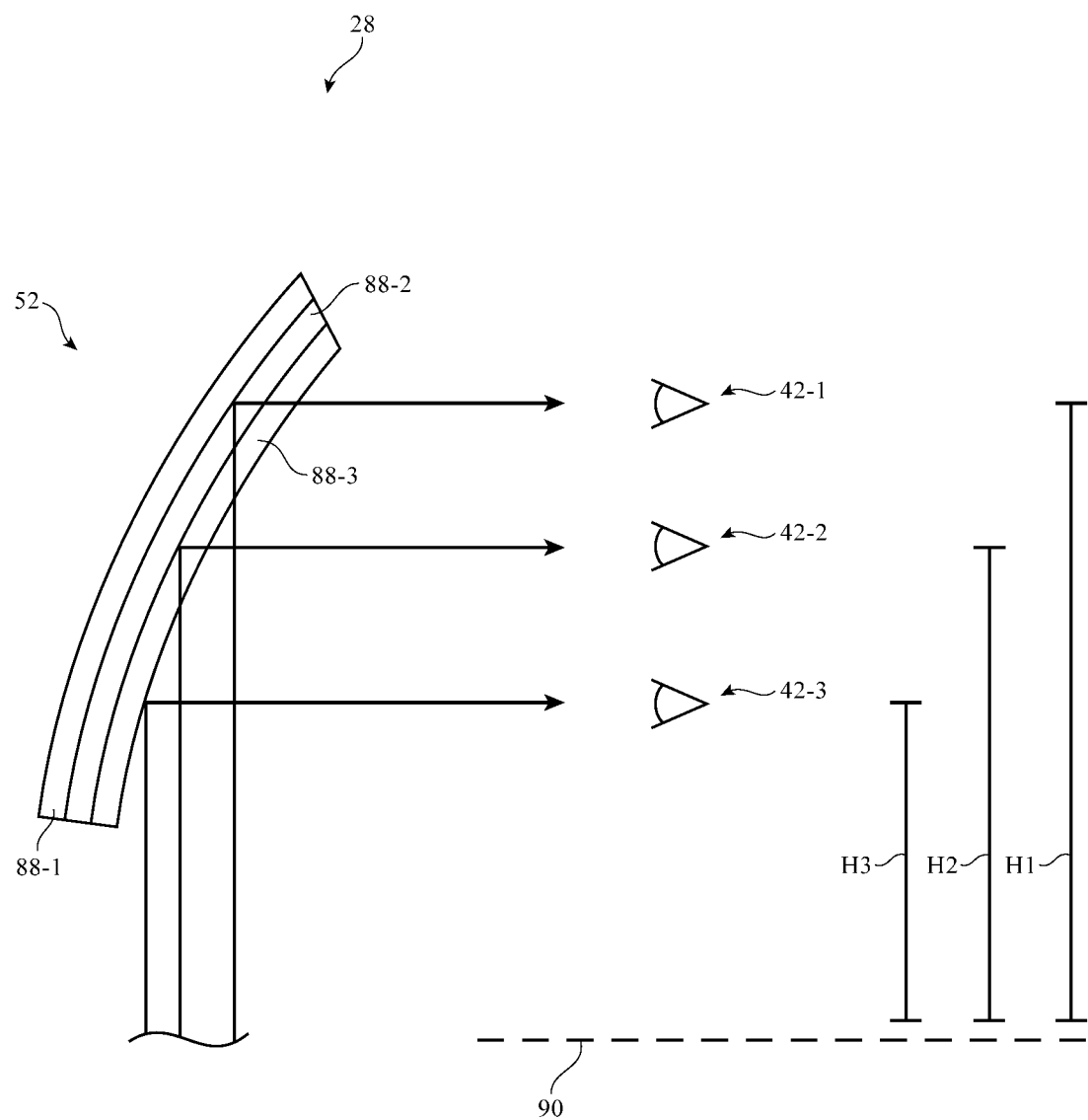
FIG. 6 is a cross-sectional side view of an illustrative head-up display of the type shown in FIG. 3 having an optical combiner formed from a holographic optical element with multiple layers of switchable diffraction gratings in accordance with an embodiment.

The use of switchable diffractive elements may enable one layer 88 to be used to diffract light while the other layers 88 are disabled or inactive. Each layer 88 may have a diffraction grating with different characteristics so that the holographic layer 88 can be turned on or off based on which characteristics are desired. For example, as shown in FIG. 6, each holographic optical element in combiner 52 may be configured to produce an image at a particular height. Holographic optical element 88-1 may redirect light towards viewer's eyes 42-1 at height H1 relative to surface 90; holographic optical element 88-2 may redirect light towards viewer's eyes 42-2 at height H2 relative to surface 90; and holographic optical element 88-3 may redirect light towards viewer's eyes 42-3 at height H3 relative to surface 90. When it is desired to present images for a driver with eyes near H1, for example, control circuitry 20 (FIG. 2) may turn holographic optical element 88-1 on and holographic optical elements 88-2 and 88-3 off.

The example of FIG. 6 in which different layers of combiner 52 are manipulated to change the eyebox associated with display 28 (e.g., the space in which a viewer can see the display content of display 28) is merely illustrative. If desired, control circuitry 20 may manipulate layers 88 of combiner 52 to change other characteristics of head-up display 28 (e.g., field of view, color, magnification, etc.).

Figure 7:
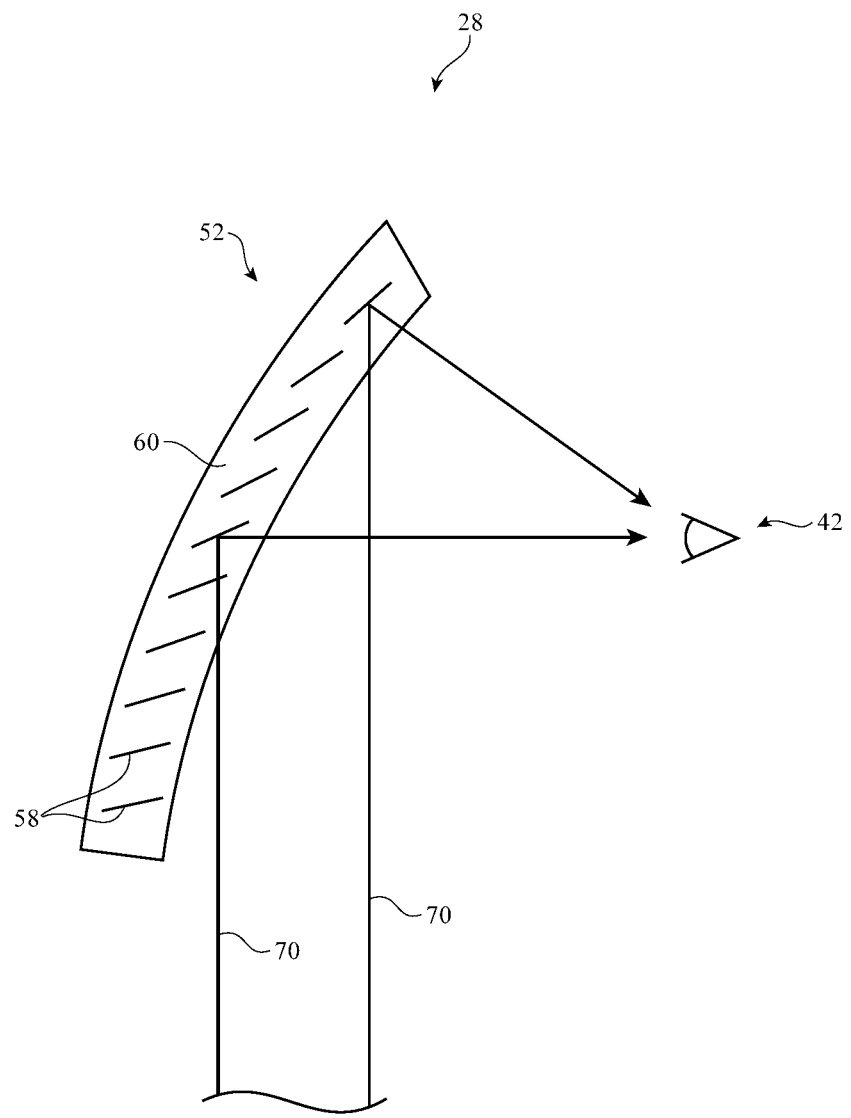
FIG. 7 is a cross-sectional side view of an illustrative head-up display of the type shown in FIG. 3 having an optical combiner formed from an array of reflective structures in accordance with an embodiment.

FIG. 7 is a cross-sectional side view of another illustrative configuration for combiner 52. In the example of FIG. 7, combiner 52 includes an array of reflectors 58 embedded in material such as index-matching material 60. Each individual reflector 58 is angled such that incoming light 70 follows the law of reflection and is reflected towards the viewer's eyes 42. Reflectors 58 may be broad band reflectors (e.g., silver reflectors, aluminum reflectors, or other suitable broad band reflectors) or may be narrow band reflectors (e.g., dichroic reflectors or other suitable narrow band reflectors). If desired, reflectors 58 may be polarization-selective.

In accordance with an embodiment, a vehicle system with a head-up display that presents output on a surface of a vehicle for viewing by a viewer in the vehicle, the vehicle system is provided that includes a door having a window, a display unit that produces display output, and an optical combiner on the window that directs the display output from the display unit towards the viewer.

In accordance with another embodiment, the optical combiner includes a holographic optical element.

In accordance with another embodiment, the holographic optical element includes a photopolymer.

In accordance with another embodiment, the holographic optical element includes a monochromatic holographic optical element.

In accordance with another embodiment, the holographic optical element includes a multi-color holographic optical element.

In accordance with another embodiment, the holographic optical element includes holographic polymer dispersed liquid crystal material.

In accordance with another embodiment, the vehicle system includes control circuitry configured to apply an electric field to the holographic polymer dispersed liquid crystal material.

In accordance with another embodiment, the optical combiner includes an array of angled reflectors.

In accordance with another embodiment, the display unit is selected from the group consisting of a light-field display unit, a liquid crystal display unit, an organic light-emitting diode display unit, an inorganic light-emitting diode display unit, a silicon display unit, a digital light processing display unit, a microelectromechanical scanned display unit, a holographic display unit, a quantum dot display unit, and a projection display unit.

In accordance with another embodiment, the combiner includes a plurality of holographic optical elements and each holographic optical element includes a hologram of at least one color.

In accordance with an embodiment, a head-up display that reflects display output off of a window in a vehicle towards a viewer in the vehicle is provided that includes a display unit that produces the display output, and a holographic optical element on the window that directs the display output from the display unit towards the viewer.

In accordance with another embodiment, the display unit includes a transmissive display with an array of pixels and a backlight.

In accordance with another embodiment, the backlight includes at least one light-emitting diode.

In accordance with another embodiment, the backlight includes at least one laser.

In accordance with another embodiment, the holographic optical element includes a photopolymer having regions with a first refractive index alternating with regions of a second refractive index that is different than the first refractive index.

In accordance with another embodiment, the holographic optical element includes a switchable diffraction grating.

In accordance with another embodiment, the switchable diffraction grating includes polymer dispersed liquid crystal material.

In accordance with another embodiment, the display unit includes a projection display unit.

In accordance with an embodiment, a head-up display that reflects display output off of a window in a vehicle towards a viewer in the vehicle is provided that includes a display unit that produces display output, and a diffractive optical element on the window that directs light towards the viewer.

In accordance with another embodiment, the window includes a side window that is located on a door of the vehicle and the diffractive optical element includes a photopolymer having regions of a first refractive index interspersed with regions of a second refractive index that is different than the first refractive index.

In accordance with another embodiment, the display unit is mounted in the door of the vehicle, light emitted from the display unit strikes the diffractive optical element on the side window at an angle of incidence, the diffractive optical element reflects the light towards the viewer at an angle of reflection, and the angle of reflection does not equal the angle of incidence.

The foregoing is merely illustrative and various modifications can be made by those skilled in the art without departing from the scope and spirit of the described embodiments. The foregoing embodiments may be implemented individually or in any combination.

What is claimed is:

1. A vehicle system with a head-up display that presents visual output, the vehicle system comprising:
   a side window of a vehicle;
   a display unit that produces display output; and
   an optical combiner on the side window that directs the display output from the display unit towards an interior of the vehicle, wherein the optical combiner is fixed relative to the display unit, wherein light from the display unit strikes the optical combiner at an angle of incidence and is directed from the optical combiner towards the interior of the vehicle at an output angle that is different from the angle of incidence, and wherein the optical combiner is configured to direct the light to at least first and second eyeboxes at different heights.

2. The vehicle system defined in claim 1 wherein the optical combiner comprises a holographic optical element having an optical interference pattern.

3. The vehicle system defined in claim 2 wherein the holographic optical element comprises a photopolymer.

4. The vehicle system defined in claim 2 wherein the holographic optical element comprises a monochromatic holographic optical element.

5. The vehicle system defined in claim 2 wherein the holographic optical element comprises a multi-color holographic optical element.

6. The vehicle system defined in claim 2 wherein the holographic optical element comprises holographic polymer dispersed liquid crystal material having an optical interference pattern.

7. The vehicle system defined in claim 6 further comprising:
control circuitry configured to apply an electric field to the holographic polymer dispersed liquid crystal material.

8. The vehicle system defined in claim 1 wherein the optical combiner comprises an array of angled reflectors.

9. The vehicle system defined in claim 1 wherein the display unit is selected from the group consisting of: a light-field display unit, a liquid crystal display unit, an organic light-emitting diode display unit, an inorganic light-emitting diode display unit, a silicon display unit, a digital light processing display unit, a microelectromechanical scanned display unit, a holographic display unit, a quantum dot display unit, and a projection display unit.

10. The vehicle system defined in claim 1 wherein the combiner comprises a plurality of holographic optical elements and wherein each holographic optical element comprises a hologram of at least one color.

11. A head-up display that reflects display output off of a side window that is located on a door of a vehicle towards an interior of the vehicle, the side window having inner and outer layers, the head-up display comprising:
a display unit mounted in the door that produces the display output and that comprises at least one laser;
an optical element in the door that couples the display output out of the door to the interior of the vehicle; and
a holographic optical element interposed between the inner and outer layers of the side window that directs the display output from the display unit towards the interior of the vehicle, wherein light from the display unit strikes the holographic optical element at an angle of incidence and is directed from the holographic optical element towards the interior of the vehicle at an output angle that is different from the angle of incidence.

12. The head-up display defined in claim 11 wherein the display unit comprises a transmissive display with an array of pixels and a backlight.

13. The head-up display defined in claim 12 wherein the at least one laser forms part of the backlight.

14. The head-up display defined in claim 11 further comprising an anti-reflective coating on the holographic optical element.

15. The head-up display defined in claim 11 wherein the holographic optical element comprises a photopolymer having regions with a first refractive index alternating with regions of a second refractive index that is different than the first refractive index.

16. The head-up display defined in claim 11 wherein the holographic optical element comprises a switchable diffraction grating.

17. The head-up display defined in claim 16 wherein the switchable diffraction grating comprises polymer dispersed liquid crystal material.

18. The head-up display defined in claim 11 wherein the display unit comprises a projection display unit.

19. A head-up display that reflects display output off of a side window that is located on a door of a vehicle towards an interior of the vehicle, comprising:
a display unit that produces display output, wherein the display unit is mounted in the door of the vehicle;
an optical element in the door that couples the light out of the door to the interior of the vehicle; and
a diffractive optical element on the side window that directs light towards the interior of the vehicle, wherein light from the display unit strikes the diffractive optical element at an angle of incidence and is directed from the diffractive optical element towards the interior of the vehicle at an output angle that is different from the angle of incidence.

20. The head-up display defined in claim 19 wherein the diffractive optical element comprises a photopolymer having regions of a first refractive index interspersed with regions of a second refractive index that is different than the first refractive index.

* * * * *